(12) United States Patent
Berger (10) Patent No.: US 12,219,187 B2
(45) Date of Patent: Feb. 4, 2025

(54) DECODER EQUIPMENT GENERATING AN ORDER FOR AN AUDIO PROFILE THAT IS TO BE APPLIED

(71) Applicant: SAGEMCOM BROADBAND SAS, Rueil Malmaison (FR)

(72) Inventor: Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 246 days.

(21) Appl. No.: 16/952,718

(22) Filed: Nov. 19, 2020

(65) Prior Publication Data

US 2021/0152858 A1 May 20, 2021

(30) Foreign Application Priority Data

Nov. 19, 2019 (FR) .................................... 19 12920

(51) Int. Cl.
*H04N 21/235* (2011.01)
*H04N 21/233* (2011.01)
*H04N 21/234* (2011.01)
*H04N 21/236* (2011.01)

(52) U.S. Cl.
CPC ....... *H04N 21/2353* (2013.01); *H04N 21/233* (2013.01); *H04N 21/234* (2013.01); *H04N 21/236* (2013.01)

(58) Field of Classification Search
CPC ............. H04N 21/2353; H04N 21/233; H04N 21/234; H04N 21/236
See application file for complete search history.

(56) References Cited

U.S. PATENT DOCUMENTS

| 2003/0007001 A1* | 1/2003 | Zimmerman | H04N 21/4318 348/E5.103 |
| 2016/0073153 A1* | 3/2016 | Hou | H04N 21/42203 725/10 |
| 2017/0134821 A1 | 5/2017 | D'Amelio et al. | |
| 2019/0265943 A1* | 8/2019 | White | H04S 7/307 |

* cited by examiner

*Primary Examiner* — Yassin Alata
(74) *Attorney, Agent, or Firm* — MUNCY, GEISSLER, OLDS & LOWE, P.C.

(57) ABSTRACT

A decoder equipment includes a first output suitable for connecting to audio playback equipment; a second output suitable for connecting to video playback equipment; a communication interface arranged in service to receive both an incoming audio/video stream and also incoming metadata; processor means arranged: to process the incoming audio/video stream in order to supply an audio signal at least to the audio playback equipment and a video signal to the video playback equipment; to extract from the incoming metadata information about the incoming audio/video stream and consequently to generate an order for the audio playback equipment, the order specifying an audio profile that is to be applied as a function of said information.

20 Claims, 7 Drawing Sheets

| |
|---|
| Thriller |
| Comedy |
| Romance |
| News |
| Documentary |
| Game show |
| Variety show |
| Sports (general) |
| Football/Soccer |
| Motor sport |
| Children's programs |
| Classical music |
| Rock |
| Ballet |
| ... |

Fig. 3a

|  | Bass gain | Mid. gain | Treble gain | Reverb. | Reverb. level | Reverb. duration | ... |
|---|---|---|---|---|---|---|---|
| Thriller | +1dB | -1dB | 0dB | on | -3dB | 100ms | |
| News | -1dB | 0dB | -1dB | off | s/o | s/o | |
| Classical music | 0dB | 0dB | 0dB | on | -6dB | 50ms | |
| ... | | | | | | | |

Fig. 3b

```
{
    "jsonrpc": "2.0",
    "method": "set_audio_profile",
    "params":{
        "bass_gain_db": 1,
        "mid_gain_db":-1,
        "treble_gain_db": 0,
        "reverb": true,
        "reverb_level_db": -3,
        "reverb_duration_ms": 100
    },
    "id": 1
}
```

Fig. 3c

```
{
    "jsonrpc": "2.0",
    "method": "set_audio_profile",
    "params":{
        "bass_gain_db":-1,
        "mid_gain_db":0,
        "treble_gain_db":-1,
        "reverb":false
    },
    "id": 1
}
```

Fig. 4a

|  | Profile |
|---|---|
| Thriller | Spectacular |
| News | Voice |
| Classical music | Hi-Fi |
| Motor sport | Spectacular |
| ... |  |

Fig. 4b

|  | Bass gain | Mid. gain | Treble gain | Reverb. | Reverb. level | Reverb. duration | ... |
|---|---|---|---|---|---|---|---|
| Spectacular | +1 dB | -1 dB | 0 dB | on | -3 dB | 100 ms |  |
| Voice | -1 dB | 0 dB | -1 dB | off | s/o | s/o |  |
| Hi-Fi | 0 dB | 0 dB | 0 dB | on | -6 dB | 50 ms |  |
| ... |  |  |  |  |  |  |  |

Fig. 4c

```
{
    "jsonrpc": "2.0",
    "method": "set_audio_profile",
    "params":{
        "profile": "voice"
    },
    "id": 1
}
```

Fig. 5

```
{
    "jsonrpc": "2.0",
    "method": "set_audio_profile",
    "params":{
        "profile_name": "spectacular",
        "bass_gain_db":-1,
        "mid_gain_db":0,
        "treble_gain_db":-1
    },
    "id": 1
}
```

```
{
    "jsonrpc": "2.0",
    "method": "set_audio_profile",
    "params": {
        "profile_name": "spectacular",
        "bass_gain_db": -1,
        "mid_gain_db": 0,
        "treble_gain_db": -1,
        "transition_start_time_s": 12345,
        "transition_end_time_s": 12375,
    },
    "id": 1
}
```

DECODER EQUIPMENT GENERATING AN ORDER FOR AN AUDIO PROFILE THAT IS TO BE APPLIED

The invention relates to the field of audio/video playback via one or more pieces of playback equipment.

BACKGROUND OF THE INVENTION

Nowadays, in modern home multimedia installations, it is very frequent for decoder equipment to be connected both to audio/video playback equipment and also to one or more pieces of audio playback equipment that are distinct from the audio/video playback equipment, for the purpose of improving a user's listening experience during playback of audio/video content.

Still for the purpose of improving the user's listening experience, it is possible to act on various parameters of the audio playback equipment, e.g. by boosting its bass or by filtering certain frequencies. The user can generally adjust these parameters either by acting directly on the audio playback equipment itself (by means of a knob, a dimmer, . . . ), or else by modifying parameters in a configuration menu projected by the audio/video playback equipment that is associated with the audio playback equipment.

Nevertheless, that obliges the user to act personally to modify the various parameters, which can be found to be relatively tedious. Also, the user does not necessarily select the most appropriate parameters.

OBJECT OF THE INVENTION

An object of the invention is to propose decoder equipment that enables the user's listening experience to be improved even more.

SUMMARY OF THE INVENTION

In order to achieve this object, the invention provides decoder equipment comprising:
- a first output suitable for connecting to audio playback equipment;
- a second output suitable for connecting to video playback equipment;
- a communication interface arranged in service to receive both an incoming audio/video stream and also incoming metadata;
- processor means arranged:
    - to process the incoming audio/video stream in order to supply an audio signal at least to the audio playback equipment and a video signal to the video playback equipment;
    - to extract from the incoming metadata at least one information about the incoming audio/video stream and consequently to generate an order for the audio playback equipment, the order specifying an audio profile that is to be applied as a function of said information;
- wherein the information is a time.

On the basis of the order sent, the audio playback equipment can act in service to adapt the audio signal received from the decoder equipment. This serves to adapt at least one of the parameters of the audio signal played back by the audio playback equipment in response to the audio/video stream input to the decoder equipment, thereby enabling the user to benefit from a very good listening experience.

It should be understood that the decoder equipment supplies the audio playback equipment both with the raw audio signal and also with an order to adapt said raw signal, with the adaptation then taking place within the audio playback equipment.

This enables the adaptation to be more effective. In particular, the decoder equipment may thus be equipment that is relatively simple (possibly even a smartphone) since it is the audio playback equipment that itself applies the processing to the audio signal in order to modify it in response to the information extracted by the decoder equipment.

The information supplied is thus a time applicable either to a program contained in the incoming audio/video stream that is being played back in service by the audio playback equipment and by the video playback equipment, or else to a program that is going to be played back subsequently in service by the audio playback equipment and by the video playback equipment.

Optionally, the processor means also extract from the incoming metadata other additional information which is a content type descriptor of the incoming audio/video stream.

Optionally, the processor means include at least one table associating each descriptor with parameters defining an audio profile, at least in part.

Optionally, the processor means include at least one table associating each descriptor with an audio profile identifier.

Optionally, the information is an end time of a program contained in the incoming audio/video stream and played back in service by the audio playback equipment and by the video playback equipment.

Optionally, the processor means also extract, from the incoming metadata, additional information comprising an end time of a program that is contained in the incoming audio/video stream and that is going to be played back in service by the audio playback equipment and by the video playback equipment after the program currently being played back by the audio playback equipment and by the video playback equipment.

Optionally, the decoder equipment is configured to cause an audio profile change to coincide with a program change.

Optionally, the audio profile is also a function of the time at which the audio/video stream is played back.

Optionally, the decoder equipment is configured to calculate a transition period between two audio profiles.

Optionally, the decoder equipment is configured to order the audio playback equipment to calculate a transition period between two audio profiles.

Optionally, the decoder equipment is configured to combine two audio profiles.

Optionally, the decoder equipment is configured to order the audio playback equipment to combine two audio profiles.

Optionally, the audio profile is defined at least by a parameter for equalizing the audio signal.

The audio profile thus contains information about equalizing the audio signal.

Optionally, the audio profile is defined at least by a compressor or limiter effect.

By way of example, the audio profile thus contains information about compressing the dynamic range of the sound.

Optionally, the transition between two profiles is caused by a change of time at which the audio/video stream is played back and/or a change of program contained in the incoming audio/video stream that is played back in service by the audio playback equipment and by the video playback equipment.

The transition between profiles thus takes place during a change of program and/or during a change of time (e.g. changing to a "night" profile).

The invention also provides audio playback equipment including a communication interface arranged in service to receive from decoder equipment both an audio signal and also an order for an audio profile that is to be applied, the audio playback equipment including processor means for adapting the audio signal as a function of said order.

Optionally, the processor means include at least one table associating audio profile identifiers with parameters defining an audio profile, at least in part.

Optionally, the audio playback equipment is configured to change audio profile at any given time specified by the decoder equipment.

Optionally, the audio playback equipment is configured to ensure a transition period between two audio profiles.

Optionally, the audio playback equipment is configured to combine two audio profiles.

Optionally, for at least one audio parameter, the audio playback equipment duplicates the audio signal it receives in service from the decoder equipment, applies respective audio parameters to each copy, and combines the two copies in order to obtain a combined audio signal.

Optionally, for at least one audio parameter, in service, the audio playback equipment applies a combined audio parameter directly to the audio signal received from the decoder equipment.

The invention also provides an installation comprising decoder equipment as specified above associated with audio playback equipment as specified above.

The invention also provides a method of generating an order for an audio profile that is to be applied by audio playback equipment, the method being performed by decoder equipment as specified above.

The invention also provides a method of applying an audio profile, which method is performed by the audio playback equipment as specified above.

The invention also provides a computer program including instructions for causing the audio playback equipment as specified above to execute the steps of the method as specified above.

The invention also provides a computer program including instructions for causing the installation as specified above to execute the steps of the method as specified above.

The invention also provides a computer readable storage medium having either of the above-mentioned computer programs stored thereon Other characteristics and advantages of the invention appear on reading the following description of a particular, nonlimiting embodiment of the invention.

BRIEF DESCRIPTION OF THE DRAWINGS

The invention can be better understood in the light of the following description given with reference to the accompanying figures, in which:

FIG. 3b shows a first example of an order for an audio profile that is to be applied as generated from the table shown in FIG. 3a;

FIG. 3c shows a second example of an order for an audio profile that is to be applied as generated from the table shown in FIG. 3a;

FIG. 4b is a table giving examples of audio profiles associated with the audio profile identifiers shown in FIG. 4a;

FIG. 4c shows a third example of an order for an audio profile that is to be applied as generated from the table shown in FIG. 4a;

DETAILED DESCRIPTION OF THE INVENTION

Figure 1:
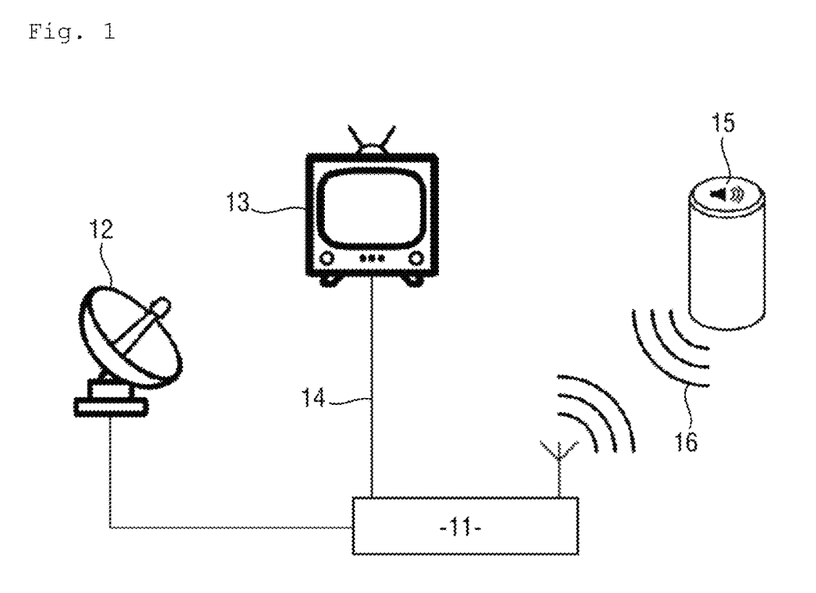
FIG. 1 shows an installation in a particular embodiment of the invention.

With reference to FIG. 1, the installation in a particular embodiment is a multimedia installation comprising decoder equipment 11 that is connected in this example to video playback equipment, and in reality in this example both to a piece of audio/video playback equipment 13, and also to a piece of audio playback equipment 15. The piece of audio playback equipment 15 is not included in the decoder equipment 11: they form two distinct entities that are in wired or wireless communication.

In this example, the decoder equipment 11 is a set-top box, the piece of audio/video playback equipment 13 is a television set, and the piece of audio playback equipment 15 is an external loudspeaker.

The audio/video playback equipment 13 is connected to an audio/video output of the decoder equipment 11. The audio playback equipment 15 is connected to an audio output of the decoder equipment 11.

The decoder equipment 11 includes processor means serving, amongst other things, to process the incoming audio/video stream.

Thus, the term "audio/video output" is used to mean output on which the decoder equipment 11 applies an audio/video signal in order to perform both audio playback and video playback via (at least) one piece of audio/video playback equipment 13 (specifically the television set). The term "audio output" is used to mean output on which the decoder equipment 11 applies an audio signal in order to perform audio playback via (at least) one piece of audio playback equipment 15 (specifically the external loudspeaker).

In corresponding manner, the audio playback equipment 15 includes processor means specific thereto for processing the audio signal sent by the decoder equipment, which signal is received via a communication interface of the audio playback equipment 15.

The main audio/video link 14 between the decoder equipment 11 and the audio/video playback equipment, and the secondary audio link 16 between the decoder equipment 11 and the audio playback equipment 15, are both links that may be wired or wireless. Any type of technology may be used for providing these links: optical, radio, etc. The links may thus be of different "physical" natures (e.g. HDMI, Toslink, RCA, etc.) and/or they may use different "computer" protocols (e.g. Bluetooth, UPnP, Airplay, Chromecast, etc.).

Thus, and in accordance with a nonlimiting option, the audio/video playback equipment 13 has an HDMI connection with the decoder equipment 11, and the audio playback equipment 15 is connected via a local network. By way of example, the local network may be a wireless network of the Wi-Fi type, or it may be a wired network of the Ethernet type. In a variant, the local network includes a Wi-Fi router, the decoder equipment 11 is connected to said Wi-Fi router by an Ethernet type wired connection, and the Wi-Fi router is connected to the audio playback equipment via a wireless connection of Wi-Fi type.

From a communication interface of the decoder equipment 11, the decoder equipment 11 acquires an incoming multimedia stream, which stream may come from one or more broadcast networks 12. The broadcast networks 12 may be of any type. Thus, in a first embodiment, the broadcast network 12 is a satellite television network, and the decoder equipment 11 receives the incoming multimedia stream via a parabolic antenna. In a second embodiment, the broadcast network 12 is an Internet connection, and the decoder equipment 11 receives the incoming multimedia stream via said Internet connection. In a third embodiment, the broadcast network 12 is a digital terrestrial television (DTT) network or a cable television network. Overall, the broadcast network 12 may be a variety of sources: satellite, cable, IP, DTT, a locally stored video stream, etc.

In particular manner, the incoming multimedia stream received by the decoder equipment 11 includes metadata together with an incoming audio/video stream that has both an audio portion and a video portion that are synchronized with each other.

The metadata contains information about said incoming audio/video stream. By way of example, the metadata may be in the DVB-SI format. This type of format is described in particular in the standard ETSI EN 300 468 "Digital Video Broadcasting Specification for Service Information in DVB systems". The metadata may equally well be included in a media presentation description (MPD) manifest, or it may be of any other type. The type of metadata is likely to depend on the broadcast network 12 in communication with the decoder equipment 11.

In this example, the processor means of the decoder equipment serve also to extract at least some of the information about the incoming audio/video stream from the metadata. In a first option, the information extracted from the metadata is a descriptor of the content type of the incoming audio/video stream, i.e. the program that is to be played back by the various pieces of playback equipment. If the metadata is in the above-described DVB-SI format, it includes a content type descriptor as specified in paragraph 6.2.9 of the ETSI EN 300468 standard, and the decoder equipment 11 thus extracts said descriptor. The ETSI EN 300 468 standard gives examples of content type descriptors in its table 28.

Figure 2:
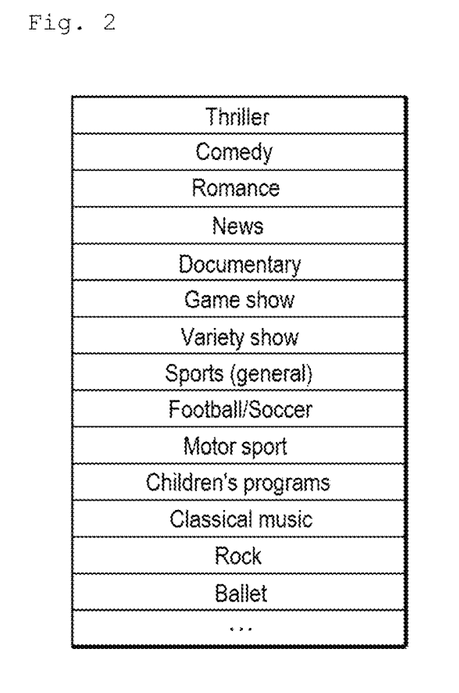
FIG. 2 is a table showing examples of content type descriptors passing through the installation shown in FIG. 1.

The table shown in FIG. 2 gives a few examples of content type descriptors for an incoming audio/video stream: thriller, comedy, romance, news, documentary, game show, variety show, sports (general), football/soccer, motor sport, children's programs, classical music, rock, ballet, etc. The content type descriptor thus describes the category of the program viewed on the audio/video playback equipment.

In this example, the content type descriptor is a string of alphanumeric characters, for example a name.

On the basis of the content type descriptor, the decoder equipment 11 generates an order for an audio profile that is to be applied by the audio playback equipment 15, which audio profile is thus a function of said content type. The decoder equipment 11 is thus adapted to control the audio playback equipment 15 so as to cause it to apply different audio profiles.

By way of example, the orders may be sent from the decoder equipment 11 to the audio playback equipment 15 using a control protocol such as the JSON-RPC protocol (for more information, reference may be made to the site https://www.jsonrpc.org), or else the CORBA protocol (for more information, reference may be made to the link https://fr.wikipedia.org/wiki/Common_Object_Request_Broker_Architecture).

An audio profile is defined by a set of parameters that affect the way sound is played back by the audio playback equipment 15. By way of example, an audio profile may be defined at least in part by an equalization curve that defines the gain that is to be applied as a function of frequency in order to emphasize or attenuate bass, mid, or treble bands. An audio profile may also be defined at least in part by one or more filters that are to be activated or deactivated, e.g. such as a reverberation filter or a background noise attenuation filter. When the audio profile is defined by at least one filter that is to be activated, it may also be defined by at least one specific parameter that is to be applied to said filter.

In nonlimiting manner, the parameters serving to define an audio profile may be a bass gain value to be applied, a mid gain value to be applied, a treble gain value to be applied, reverberation filter on or off, the sound level of said filter, the application duration of said filter, . . . .

In order to generate the orders for audio profiles that are to be applied, the decoder equipment 11 includes a table that enables the audio profile that is to be applied to be identified for each content type descriptor.

Figure 3A:
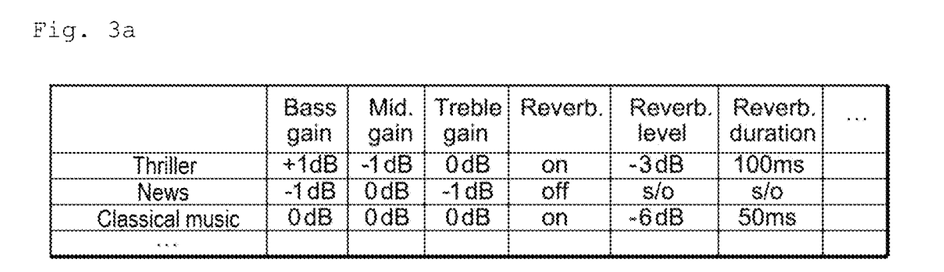
FIG. 3a is a table giving examples of audio profiles associated with the content type descriptors shown in FIG. 2.

In a first a variant, this table gives each content type descriptor a definition for at least some of the parameters constituting the corresponding audio profile and preferably for all of said parameters. FIG. 3a shows an example of such a table. Each content type descriptor (thriller, news, classical music, . . . ) is associated with the set of parameters for the corresponding audio profile (a bass gain value to be applied, a mid gain value to be applied, a treble gain value to be applied, reverberation filter on or off, sound level of said filter, and application duration of said filter, . . . ).

In service, the decoder equipment 11 receives the incoming multimedia stream and decodes it in order to extract both the audio/video stream and also the metadata.

As above, the decoder equipment 11 extracts, from said audio/video stream, both a video signal for the audio/video playback equipment 13, and also an audio signal for the audio playback equipment 15, and possibly for built-in loudspeakers of the audio/video playback equipment 13.

Figure 3B:
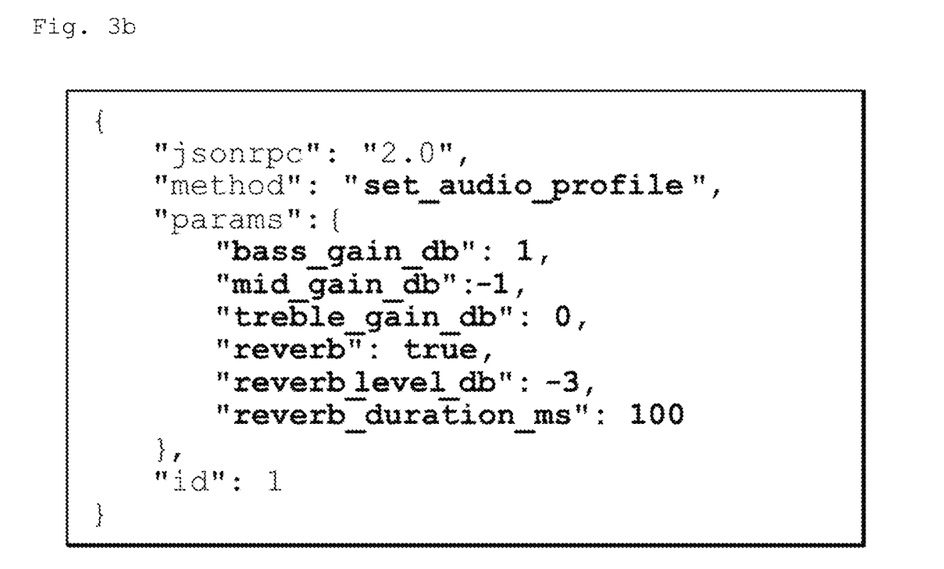
Figure 3C:
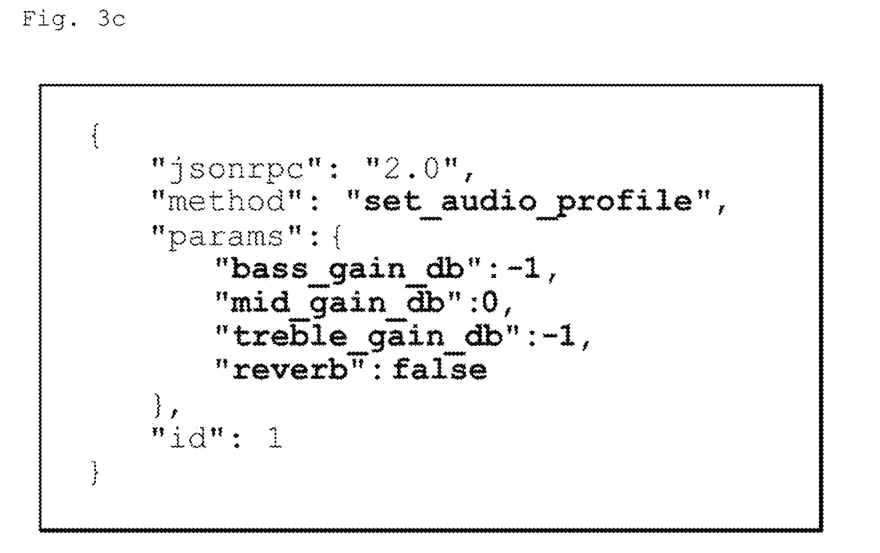

Furthermore, from the metadata, the decoder equipment 11 extracts at least the content type descriptor of the audio/video stream, and from its table it deduces the set of parameters that make up the corresponding audio profile. The decoder equipment 11 thus supplies an order to the audio playback equipment 15 for an audio profile that is to be applied, which order in this example is in the form of the set of parameters that are to be applied in order to generate the profile. FIGS. 3*b* and 3*c* give examples of orders sent by the decoder equipment 11 to the audio playback equipment 15 (by way of nonlimiting example, the orders are shown written using the JSON-RPC protocol).

The audio playback equipment 15 thus recovers both the audio signal and the order, and consequently the processor means of said audio playback equipment 15 modify the audio signal by applying thereto the parameters contained in the order. The audio signal applied by the audio playback equipment 15 is thus a function of the program being viewed on the audio/video playback equipment 13.

It can thus be seen that the decoder equipment 11 does not itself adapt the audio/video stream, and the only processing it performs on the audio/video stream serves to provide both an audio signal on at least the output terminal linked to the audio playback equipment 15, and also a video signal on the output terminal linked to the audio/video playback equipment 13. In the invention, it is indeed the audio playback equipment 15 that itself modifies the audio signal sent by the decoder equipment 11 in order to adapt it.

It should also be observed that the order sent by the decoder equipment 11 is not the content type descriptor, but directly the parameters for modifying the playback of the sound. The type of content viewed on the audio/video playback equipment 13 is indeed determined by the decoder equipment 11 and not by the audio playback equipment 15.

Figure 4A:
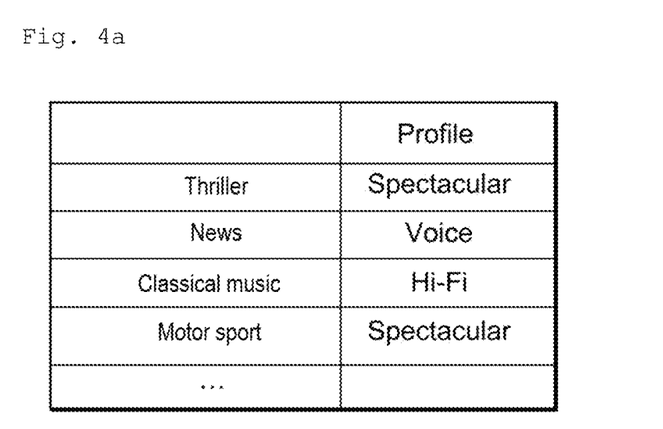
FIG. 4a is a table giving examples of audio profile identifiers associated with the content type descriptors shown in FIG. 2.

In a second variant, for each content type descriptor, this table defines an identifier of the corresponding audio profile. FIG. 4*a* shows an example of such a table. Each content type descriptor (thriller, news, classical music, motor sport, . . . ) is associated with an identifier of the corresponding audio profile (spectacular, voice, hi-fi, spectacular, . . . ). The identifier of the audio profile thus describes the effect of the looked-for audio profile. An audio profile identifier is thus not a content type descriptor.

In this example, an audio profile identifier is a string of alphanumeric characters, for example a name.

Figure 4B:
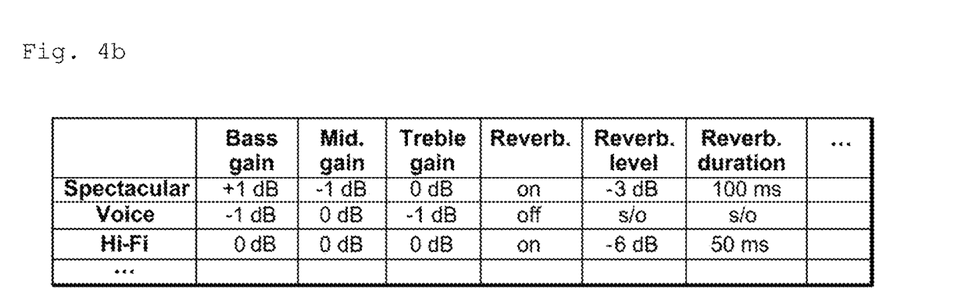

In corresponding manner, the audio playback equipment 15 includes a table associating each audio profile identifier with a definition of at least some of the parameters making up the corresponding audio profile, and preferably of all of said parameters. FIG. 4*b* shows an example of a table. Each audio profile identifier (spectacular, voice, hi-fi, . . . ) is associated with the set of parameters of the corresponding audio profile (a bass gain value to be applied, a mid gain value to be applied, a treble gain value to be applied, reverberation filter on or off, sound level of said filter, and application duration of said filter, . . . ).

In service, the decoder equipment 11 receives the incoming multimedia stream and decodes it in order to extract both the audio/video stream and also the metadata.

As above, the decoder equipment 11 extracts, from said audio/video stream, both a video signal for the audio/video playback equipment 13, and also an audio signal for the audio playback equipment 15, and possibly for built-in loudspeakers of the audio/video playback equipment 13.

Furthermore, the decoder equipment 11 extracts, from the metadata, at least the content type descriptor of the audio/video stream, and deduces, from its table, the identifier of the corresponding audio profile.

Figure 4C:
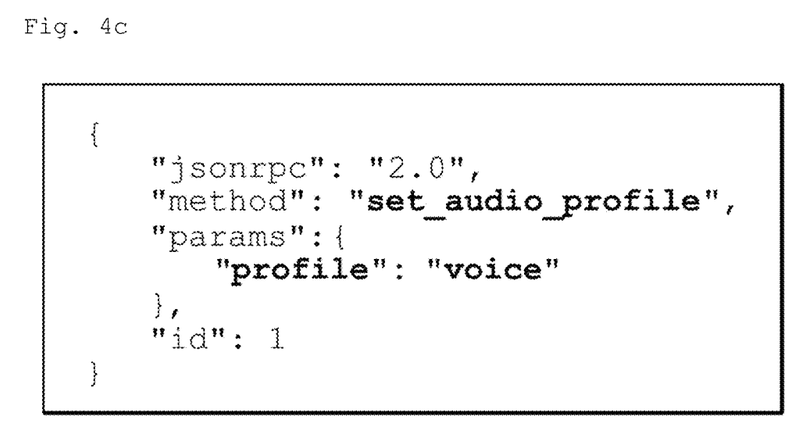

Consequently, the decoder equipment 11 sends an order to the audio playback equipment 15 for an audio profile that is to be applied, which order, in this example, is in the form of the identifier of said profile. FIG. 4*c* gives an example of an order sent by the decoder equipment 11 to the audio playback equipment 15 (by way of nonlimiting example, the order is shown written using the JSON-RPC protocol).

The audio playback equipment 15 thus receives both the audio signal and the corresponding order. The processor means of the audio playback equipment 15 use the table contained therein to recover the set of parameters that constitute the corresponding audio profile. Consequently, said processor means of the audio playback equipment 15 modify the audio signal by applying said parameters.

It can thus be seen that the decoder equipment 11 does not itself adapt the audio/video stream, and the only processing it performs on the audio/video stream serves to provide both an audio signal on at least the output terminal linked to the audio playback equipment 15, and also a video signal on the output terminal linked to the audio/video playback equipment 13. In the invention, it is indeed the audio playback equipment 15 that itself modifies the audio signal sent by the decoder equipment 11 in order to adapt it.

It should also be observed that the order sent by the decoder equipment 11 is not the content type descriptor but directly the identifier of the profile that is to be applied. The type of content viewed on the audio/video playback equipment 13 is indeed determined by the decoder equipment 11 and not by the audio playback equipment 15.

Two different pieces of audio playback equipment may have their own tables that are different, and consequently they can associate different parameters with the same profile identifier coming from the decoder equipment 11: the second variant thus has the advantage of being able to adapt to the specific characteristics of the respective loudspeakers of the respective pieces of audio playback equipment.

A third variant combining the first variant and the second variant is also applicable.

In this third variant, the decoder equipment 11 has a first table giving each content type descriptor a definition of at least some of the parameters that constitute the corresponding audio profile (similar to that shown in FIG. 3*a*) and a second table giving each content type descriptor an identifier of the corresponding audio profile (similar to that shown in FIG. 4*a*).

Correspondingly, the audio/video playback equipment 15 includes a third table associating each audio profile identifier with a definition of at least some of the parameters making up the corresponding audio profile (similar to that shown in FIG. 4*b*).

In service, the decoder equipment 11 receives the incoming multimedia stream and decodes it in order to extract both the audio/video stream and also the metadata.

As above, the decoder equipment 11 extracts, from said audio/video stream, both a video signal for the audio/video playback equipment 13, and also an audio signal for the audio playback equipment 15, and possibly for built-in loudspeakers of the audio/video playback equipment 13.

Furthermore, the decoder equipment 11 extracts, from the metadata, at least one content type descriptor of the audio/video stream, and deduces, from the first table, the corresponding audio profile parameters and, from the second table, the identifier of the corresponding audio profile.

Consequently, the decoder equipment 11 sends an order to the audio playback equipment 15 for an audio profile that is to be applied, which order, in this example, is in the form both of the identifier of said profile and also of the parameters present in the first table.

Starting from this order, if the audio playback equipment 15 does not recognize the identifier sent by the decoder equipment 11, then the audio playback equipment 15 makes use of the parameters present in the order (coming from the first table) in order to adapt the audio signal (in similar manner to that described in the first variant).

In contrast, if the audio playback equipment 15 does recognize the identifier sent by the decoder equipment 11, then:

- in one particular embodiment, the audio playback equipment 15 ignores the parameters sent by the decoder equipment 11 and makes use of the parameters coming from its own third table as determined by the identifier (in similar manner to that described in the second variant);
- in another particular embodiment, the audio playback equipment 15 makes use of the parameters sent by the decoder equipment 11, and if any parameters are missing, it fills in with the values contained in its own third table;
- in yet another particular embodiment, the audio playback equipment 15 combines the parameters sent by the decoder equipment 11 with the parameters contained in its own third table and then applies the combined parameters. The manner in which the audio playback equipment 15 can make such a combination is described below in the present application.

This third variant makes it possible to manage potential alterations to an installation by enabling a version of the audio playback equipment 15 that is more recent than the decoder equipment 11 to have new parameters available in association with an audio profile and to be able to apply them, even though the older decoder element 11 has no knowledge of the new parameters. Also, this third variant makes it possible to give priority to the data of the decoder equipment 11 (data that may be personalized by the user, e.g. via a configuration menu displayed on the audio/video playback equipment 13).

Figure 5:
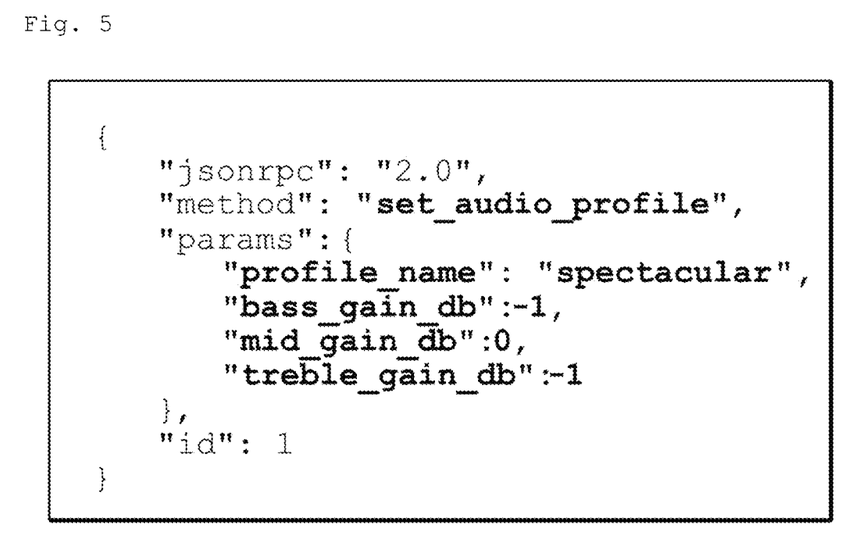
FIG. 5 shows a fourth example of an order for an audio profile that is to be applied passing through the installation shown in FIG. 1.

FIG. 5 gives an example of an order sent by the decoder equipment 11 to the audio playback equipment 15 (by way of nonlimiting example, this order is written using the JSON-RPC protocol), the order containing both an audio profile identifier and also parameters. On receiving this order, if the audio playback equipment 15 recognizes the identifier, it determines from its own third table whether there are any parameters other than those sent by the decoder equipment 11 and corresponding to the identifier that are to be applied in order to be added to the data sent by the order.

The above description relates to a first option for an installation and a method enabling the audio signal that is played back by the audio playback equipment to be adapted to the type of program being viewed on the audio/video playback equipment.

In a second option, the installation is configured to adapt the audio signal that is played back by the audio playback equipment 15 as a function of time.

For this purpose, the decoder equipment 11 includes a clock and it generates an audio profile order as a function of time. Thus, by way of example, it may order a "normal" profile during the day and a "night" profile in the evening and at night. By way of example, the "night" profile may include parameters such as attenuating bass frequencies (it being known specifically that bass frequencies carry farther and are therefore a greater nuisance for neighbors). Alternatively, or in addition, the "night" profile may lower the volume overall while selecting equalization parameters in which bass and treble attenuation is less than mid attenuation, since this is known to give the listener the impression that the volume is higher than it really is (in particular, this effect used to be referred to as "loudness" on old hi-fi systems). Alternatively, or in addition, the "night" profile may activate a "compressor" or "limiter" effect (for more information, reference may be made to the following article https://fr.wikipedia.org/wiki/Compresseur_%28audio%29) that decreases the volume of noisy sequences while preserving the volume of quieter sequences, and as a result the noisiest sequences (such as explosions in a film) are attenuated, while quieter sequences remain audible.

By way of example, the decoder equipment 11 includes a table giving each timeslot a definition of at least some of the parameters (bass gain, mid gain, . . . ) and preferably all of the parameters defining audio profiles and/or a table giving each timeslot an audio profile identifier ("night", "day", . . . ), and the audio playback equipment 15 then includes a table associating said identifiers with at least some of the parameters constituting the corresponding audio profile, and preferably with all of the parameters. Operation is then similar to that of the first option concerning the three variants that are described for the first option.

Furthermore, in order to generate the order, the decoder equipment 11 combines the time scheduled for changing the audio profile with at least some of the information extracted from the metadata other than the content type descriptor of the audio/video stream.

Typically, the decoder equipment 11 extracts, from the metadata, a marker of the audio/video stream that is being transcribed by the audio/video equipment 13 (i.e. the program that is being played), information about the time the program is to end, and information about the time the following program is to end. If the metadata is in the DVB-SI format as described in section 5.2.4 of the ETSI EN 300 468 standard, the decoder equipment 11 thus extracts from the metadata the marker of the program being transcribed, the metadata being in the form of "event_id" and the information "start_time" and "duration" enabling the decoder equipment 11 to calculate the end time of the program being played and the end time of the following program.

Combining the time scheduled for the change of audio profile at least with the end time of the program being viewed serves to minimize any inconvenience for the user while the audio profile is being changed, e.g. by shifting the instant at which the audio profile is changed so as to make it coincide with a change of program.

Figure 6:
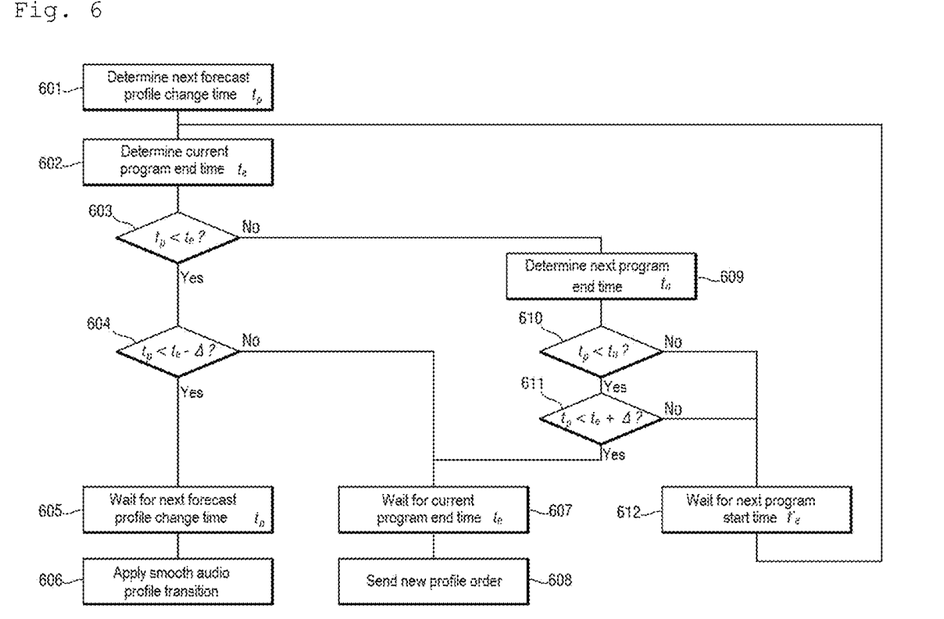
FIG. 6 is a flowchart illustrating a first possibility for the device shown in FIG. 1 to adapt an audio signal as a function of the time and of information extracted from metadata.

With reference to FIG. 6, there follows a description of a method in accordance with a first possibility that enables the time scheduled for changing the audio profile to be combined with the end times of the current program and of the next program.

If the forecast time for the change of profile is close to a change of program, then this method provides for the decoder equipment 11 to apply the change of profile at the moment the program changes. Advantageously, if the forecast time for the change of profile is remote from any change of program, then the decoder equipment 11 applies the change of profile at the forecast time while ensuring that the transition between the old profile and the new profile is smooth.

In a step 601, the decoder equipment 11 determines the time $t_p$ forecast for the next change of profile.

In a step 602, the decoder equipment 11 determines the end time $t_e$ of the current program from the incoming metadata.

In a step 603, the decoder equipment 11 compares the time $t_p$ forecast for the next change of profile with the end time $t_e$ of the current program. If the time $t_p$ forecast for the next change of profile is earlier than the end time $t_e$ of the current program, then the decoder equipment 11 continues with a step 604, otherwise the decoder equipment 11 continues with a step 609.

In step 604, the decoder equipment 11 compares the time $t_p$ forecast for the next change of profile with the end time $t_e$ of the current program as reduced by subtracting a fixed time interval $\Delta$. If the time $t_p$ forecast for the change of profile is earlier than the reduced end time $t_e-\Delta$ of the current program, then the decoder equipment 11 continues with a step 605, otherwise the decoder equipment 11 continues with a step 607. By way of example, $\Delta$ may be selected to be equal to 5 minutes.

In step 605, the decoder equipment 11 waits for the time $t_p$ forecast for the next change of profile, and then in a step 606, the decoder equipment 11 sends the external equipment 15 at least an order for a new audio profile that is to be applied, thereby causing a smooth transition to take place between the old audio profile and the new audio profile. The way in which the installation can perform a smooth transition is explained below in the present application.

In step 607, the decoder equipment 11 waits for the end time $t_e$ of the current program, and then in a step 608, the decoder equipment 11 sends the audio playback equipment 15 an order for a new audio profile that is to be applied.

In step 609, the decoder equipment 11 determines the end time $t_n$ of the next program from the incoming metadata.

In a step 610, the decoder equipment 11 compares the time $t_p$ forecast for the next change of profile with the end time $t_n$ of the next program. If the time $t_p$ forecast for the next change of profile is earlier than the end time $t_n$ of the next program, then the decoder equipment 11 continues with a step 611, otherwise the decoder equipment 11 continues with a step 612.

In step 611, the decoder equipment 11 compares the time $t_p$ forecast for the next change of profile with the end time $t_e$ of the current program increased by a fixed time interval $\Delta$ (by way of example, the time interval $\Delta$ is taken to be equal to 5 minutes). If the time $t_p$ forecast for the change of profile is earlier than the increased end time $t_e+\Delta$ of the current program, then the decoder equipment 11 continues with a step 607, otherwise the decoder equipment continues with a step 612.

In step 612, the decoder equipment 11 waits for the beginning of the next program, and then returns to step 602.

There follows a description of a method in accordance with a second possibility that enables the time scheduled for changing the audio profile to be combined with the end times of the current program and of the next program.

This second possibility is identical to the first possibility except that the decoder equipment 11 no longer applies a smooth transition. In this second possibility, once the time $t_p$ forecast for the next change of profile has been reached in step 605, the decoder equipment 11 continues with step 608 and sends the audio playback equipment 15 an order for a new audio profile.

Figure 7:
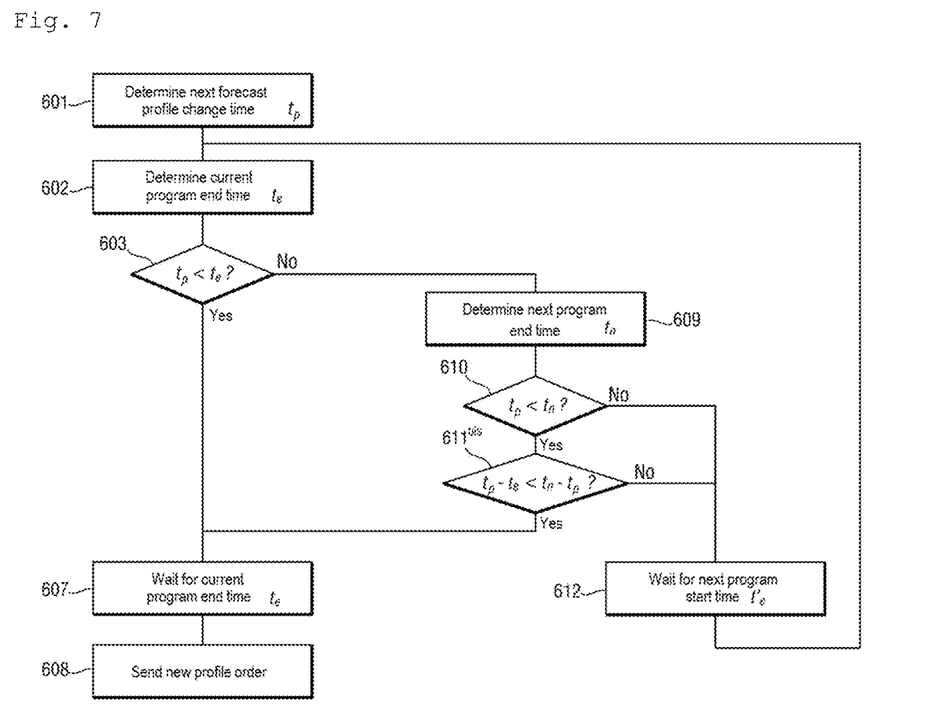
FIG. 7 is a flowchart illustrating a second possibility for the device shown in FIG. 1 to adapt an audio signal as a function of the time and of information extracted from metadata.

With reference to FIG. 7, there follows a description of a third possibility for the method that enables the time scheduled for changing the audio profile to be combined with the end times of the current program and of the next program.

In this third possibility, the decoder equipment 11 always causes the change of profile to coincide with the nearest program transition.

Thus, in step 603, if the time $t_p$ forecast for the next change of profile is earlier than the end time $t_e$ of the current program, the decoder equipment 11 continues with step 607 and waits for the end of the current program in order to send the new profile order to the audio playback equipment 15.

Likewise, in a step 611$^{bis}$, the decoder equipment 11 compares the time $t_p$ forecast for the next change of profile both with the end time $t_e$ of the current program and also with the end time $t_n$ of the next program, and then if the time $t_p$ forecast for the next change of profile is closer to the end time $t_e$ of the current program ($t_p-t_e<t_n-t_p$) then the decoder equipment 11 continues with step 607, otherwise the decoder equipment 11 continues with step 612.

There follows a description of a fourth possibility for the method of combining the time scheduled for changing the audio profile with the end times of the current program and of the next program.

This fourth possibility is identical to the third possibility except that in step 608, the decoder equipment 11 makes a smooth transition to the new profile, i.e. in addition to always causing the change of profile to coincide with the nearest program transition, the decoder equipment 11 also always applies a transition that is smooth.

Naturally this possibility of always applying a transition that is smooth can also be implemented in the first above-described possibility. The decoder 11 can thus make a smooth transition to the new profile in step 608 of FIG. 6, i.e. in addition to always causing the change of profile to coincide with the nearest program transition, the decoder equipment 11 also always applies a transition that is smooth.

Advantageously, this transition is of a duration that is shorter than the transition performed in the first possibility. For example, in step 608, the decoder equipment 11 makes a smooth transition having a duration of about one second, while in the first possibility, the decoder 11 makes a smooth transition having a duration of several tens of seconds. For example, in step 608, the decoder equipment 11 makes a smooth transition having a duration of one second, while in the first possibility, the decoder equipment 11 makes a smooth transition having a duration of thirty seconds.

The description above relates to a second option for an installation and a method of enabling the audio signal played back by the audio playback equipment to be adapted to the time of content type program being played back.

In a third option, it is possible to combine the first two above-described options.

In particular, it is possible to adapt the audio signal transcribed by the audio playback equipment 15 from the content type descriptor (as in the first option) and also to change from one audio profile to another via a transition that is smooth (as in the second option).

In addition, it is possible to adapt the audio signal transcribed by the audio playback equipment 15 both from the content type descriptor (as in the first option) and also from the time (as in the second option) by combining the corresponding sets of parameters. As mentioned above, combining two audio profiles is described below.

Whatever the intended option (content type descriptor and/or time), the decoder equipment 11 is configured, were so desired, to be capable of making a smooth transition when passing from a first audio profile to a second audio profile.

For this purpose, and in a first implementation, the decoder equipment 11 determines a start of transition instant $t_{ts}$ and an end of transition instant $t_{te}$. For example, the decoder equipment 11 determines a transition instant $t_t$, and the start and end of transition instants are calculated to be on either side of the transition instant $t_t$: $t_{ts}=t_t-d_t/2$ and $t_{te}=t_t+d_t/2$ with $d_t$ being a fixed duration. For example, $d_t$ is equal to 30 seconds if a normal smooth transition is intended and to 1 second if a short smooth transition is intended. The transition instant $t_t$ may correspond to the end time $t_e$ of the current program, to the time $t_p$ forecast for the change of profile, . . . . By way of example, the transition instant $t_t$ may be determined as explained with reference to the second option. Otherwise, it is the start of transition instant $t_{ts}$ that is determined, and the end of transition instant $t_{te}$ is calculated as being equal to $t_{ts}+d_t$. Alternatively, it is the end of transition instant $t_{te}$ that is determined and the start of transition instant $t_{ts}$ is calculated as being equal to $t_{te}-d_t$.

Figure 8:
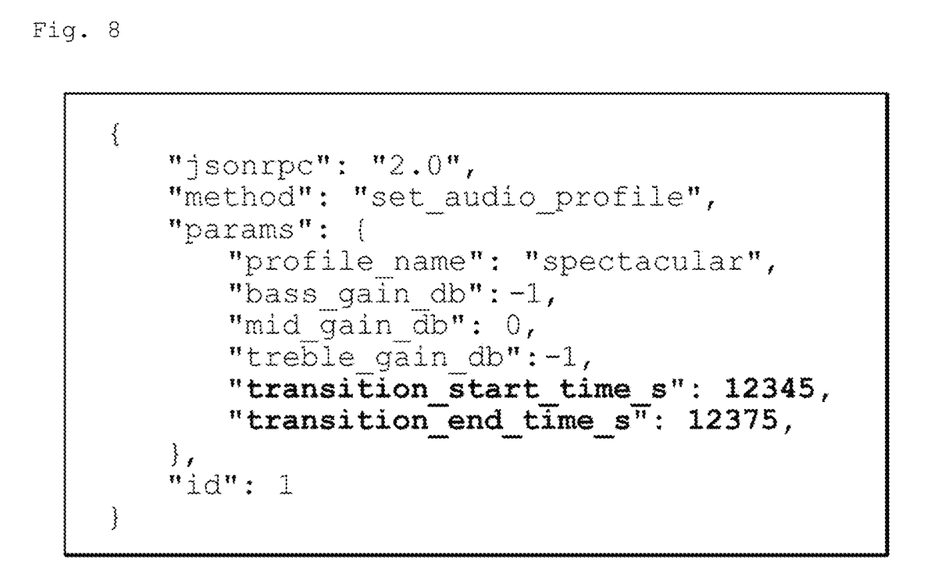
FIG. 8 shows a fifth example of an order for an audio profile that is to be applied passing through the installation shown in FIG. 1.

The decoder equipment 11 thus sends an order to the audio playback equipment 15 to apply the new profile, which order also includes the start and end of transition instants $t_{ts}$ and $t_{te}$. FIG. 8 gives an example of an order sent by the decoder equipment 11 to the audio playback equipment 15 (by way of nonlimiting example, this order is written using the JSON-RPC protocol), the order containing simultaneously an identifier of a new audio profile, parameters of said new audio profile, and the start and end of transition instants $t_{ts}$ and $t_{te}$.

For any instant t lying in the range $t_{ts}$ to $t_{te}$, the audio playback equipment 15 then calculates a combination coefficient $\alpha=(t-t_{ts})/(t_{te}-t_{ts})$ and it combines the parameters of the old audio profile and of the new audio profile using this combination coefficient. As mentioned above, the way in which the installation combines two sets of parameters is described below.

In a second implementation, it is the audio playback equipment 15 that calculates the start of transition instant $t_{ts}$ and the end of transition instant $t_{te}$. For this purpose, the order for the new audio profile that is to be applied as sent by the decoder equipment 11 also includes a transition duration.

The audio playback equipment 15 uses the instant at which it receives the order as the start of transition instant $t_{ts}$ and it calculates the end of transition instant $t_{te}$ from said start of transition instant $t_{ts}$ and the received transition duration.

In a third implementation, it is the decoder equipment 11 that itself calculates the combination coefficient $\alpha$ and regularly sends orders to the audio playback equipment 15, which orders include this coefficient as the transition is progressing.

In a fourth implementation, it is the decoder equipment 11 itself that combines the audio profiles and it regularly sends orders to the audio playback equipment 15, which orders include the parameters as combined progressively as the transition is progressing.

Whatever the intended option (content type descriptor and/or time), the decoder equipment 11 is configured, if so desired, to be capable of combining two audio profiles. There follows a description of various alternatives that the installation can perform in order to combine two audio profiles. It should be understood that combination may take place in the decoder equipment 11 or in the audio playback equipment 15.

In a first alternative, the installation performs a simple combination.

The installation combines two sets of parameters, each associated with a respective audio profile, in order to obtain a single set of parameters that are to be applied. For example, the two sets of parameters may be firstly the set of parameters of the order sent by the decoder equipment 11 to the audio playback equipment 15 as shown in FIG. 5 and secondly a set of parameters extracted from a table in the memory of the playback equipment as shown in FIG. 4b.

In order to combine the two sets of parameters, the audio playback equipment 15 acts, for each parameter, by looking at the value coming from the first set and the value coming from the second set, and as a function of said two values, it constructs a combined value that is to be applied:

if one of the two sets of parameters does not contain a value for any one of the parameters, then the combined value is the value coming from the other set of parameters;

if both of the sets of parameters contain a value for any one of the parameters, then the combined value depends on the type of the parameter:

some parameters are gain levels or volume levels. By way of example, this applies to a gain or to a filter level. For these parameters:

in a first implementation, the combined value is the smaller or the larger of the values for this parameter coming from the two sets of parameters as expressed in decibels;

in a second implementation, the combined value is the average of the values for this parameter coming from the two sets of parameters expressed in decibels;

in a third implementation, the combined value is the sum of the values for this parameter coming from the two sets of parameters expressed in decibels. This third implementation is particularly adapted for gains, but it is less well adapted for levels.

Some parameters are durations. This applies for example to a reverberation duration. For these parameters:

in a first implementation, the combined value is the smaller or the larger of the values for this parameter coming from the two sets of parameters;

in a second implementation, the combined value is the average of the values for this parameter coming from the two sets of parameters;

Some parameters are Boolean values. This applies for example when determining whether a filter is to be on or off. For these parameters:

if both sets of parameters have the same value, then the combined value is equal to that same value;

if both sets of parameters have different values, then:

in a first implementation, the combined value is equal to the "true" logic value;

in a second implementation, the combined value is equal to the "false" logic value;

in a third implementation, the element (e.g. the filter) controlled by the value of the Boolean parameter is also associated with a secondary parameter that affects the magnitude of its effect. By way of example, this applies to the "level" parameter for a reverberation filter. Under such circumstances, the combined value of the Boolean parameter is equal to the "true" logic value, and the combined value of the associated secondary parameter has its value reduced (relative to the value of the non-combined associated secondary parameter). For example, the combined value of the "level" secondary parameter is equal to the value of the "level" secondary parameter in the set of parameters for which the "filter" parameter is "true" minus a predetermined fixed value (e.g. 3 dB).

Otherwise, or in addition, if both sets of parameters contain values for any one of the parameters, then the combined value is determined in compliance with the second alternative as described below while using a predetermined value for the correlation coefficient α, for example 0.5.

In a second alternative, the installation performs weighted combination.

The installation combines two sets of parameters, each associated with a respective audio profile in order to obtain a single set of parameters that are to be applied in compliance with a variable combination coefficient α. By way of example, the two sets of parameters may be the sets for the start and the end of a smooth transition, and the combination coefficient α is representative of progress through the transition such that α=0 at the beginning of the transition and α=1 at the end of the transition.

Figure 9:
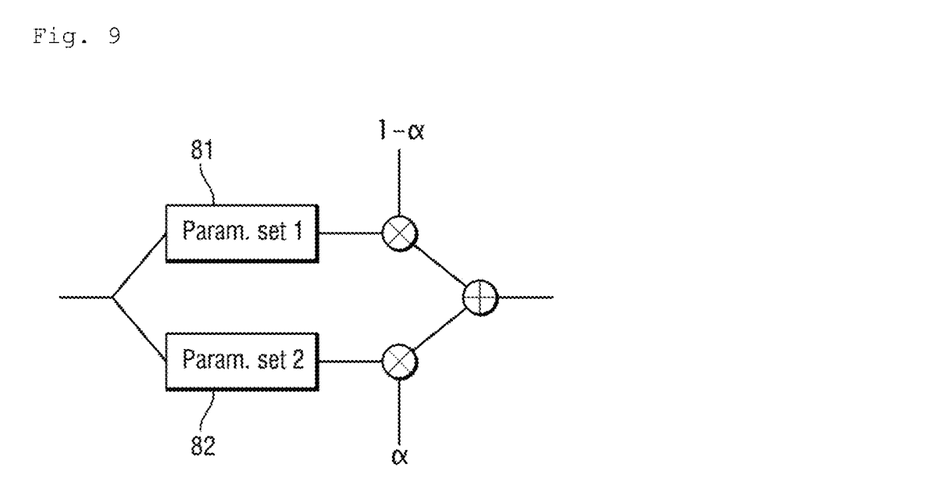
FIG. 9 is a diagram showing a first variant of two sets of audio parameters being combined by the installation shown in FIG. 1.

With reference to FIG. 9, in a first implementation, the audio signal received by the audio playback equipment 15 is copied, and each copy is processed independently with a respective one of the two sets of parameters by respective processes 81 and 82. Thereafter, the two processed copies $s_1$ and $s_2$ are combined by an average that is weighted by the combination coefficient α in order to obtain a modified audio signal $s_o$ that is to be played back: $s_o=(1-\alpha)\times s_1+\alpha\times s_2$.

It should be observed that this first implementation is equally applicable regardless of whether the processes 81 and 82 comprise different processes or the processes 81 and 82 are identical. Furthermore, this implementation can be used even if one of the processes 81 or 82 does not modify the audio signal received by the audio playback equipment 15, with this making it possible, for example, to activate or deactivate a parameter and thus a sound effect in smooth manner.

The first implementation thus proposes combining two sets of parameters by processing said sets independently.

This first implementation presents the advantage of being generic: it can be applied to any pair of processes 81 and 82. In contrast, this first implementation is relatively expensive in terms of calculation since it requires the audio signal that is received by the audio playback equipment 15 to be processed twice over.

In a second implementation, the parameters of the two sets are combined independently in pairs in order to obtain a set of combined parameters, which set is then applied once only to the audio signal that is received by the audio playback equipment 15.

In a second implementation:
Certain parameters have numerical values. These parameters are combined by an average that is weighted by the combination coefficient α.
Certain parameters are Boolean values, e.g. defining whether a filter is or is not to be applied. For these parameters:
if both sets of parameters have the same value, then the combined value is equal to that same value;
if both sets of parameters have different values, then one of the sets of parameters, referred to as the "active" set of parameters contains the value "true" and the other set of parameters, referred to as the "inactive" set of parameters, contains the value "false". Under such circumstances, the combined parameter takes the "true" value. In addition:
In a first option, the other secondary parameters of the element controlled by said Boolean parameter are combined by taking the values of the active set of parameters and by imposing predetermined minimum values as values for the inactive set of parameters (and not the real values of said inactive set of parameters). For example, if the Boolean parameter controls activation of a filter, the level secondary parameter of the filter of the inactive set of parameters is taken as having a value of −60 dB and the application duration secondary parameter of the filter of the inactive set of parameters is taken as having a value of zero.
In a second option, the elements controlled by said Boolean parameter includes a secondary parameter that affects the magnitude of its effect. Under such circumstances, said parameter is combined by taking the value of the active set of parameters and by imposing a predetermined minimum value as the value for the inactive set of parameters (and not its real value). The other parameters of said element take values equal to the corresponding values of the active set of parameters. For example, if the Boolean parameter controls activation of a filter, the level secondary parameter of the filter of the inactive set of parameters is taken to have a value of −60 dB. In contrast, the combined value of the application duration secondary parameter of the filter is taken to be equal to the value of the application duration secondary parameter of the filter in the active set of parameters.

A third implementation is described below that combines the two implementations described above. This third implementation thus proposes a hybrid combination of two sets of parameters.

In this third implementation, certain parameters are thus combined independently in pairs in order to obtain a partial set of combined parameters suitable for application once only to the audio signal received by the audio playback equipment (as in the second implementation), and other parameters are combined by independent processing (as in the first implementation).

Figure 10:
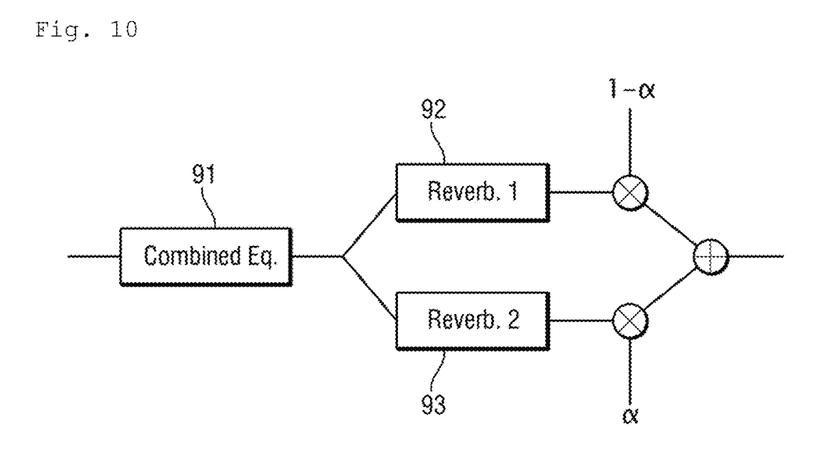
FIG. 10 is a diagram showing a second variant of two sets of audio parameters being combined by the installation shown in FIG. 1.

For example, and with reference to FIG. 10, the equalization parameters may be combined to be applied to the signal once only by a process 91, while the parameters of a filter, such as a reverberation filter, are applied to the signal by independent processes 92 and 93 (via copies of the signal) and they are combined a posteriori.

Naturally, the invention is not limited to the embodiment described above, and variant embodiments may be provided without going beyond the ambit of the invention as defined by the claims.

Thus, although above, the decoder equipment is a decoder box, the decoder equipment could be any other equipment capable of forming audio/video decoding, and for example it could be a games console, a computer, a smart TV, a digital tablet, a mobile telephone, a digital television decoder, a set-top box, etc.

Although above the video playback equipment is audio/video playback equipment, it could be any other type of video playback equipment, such as a television set, a video projector, a tablet, a mobile telephone, etc. The video equipment and the decoder equipment could thus together form a single entity.

Likewise, although above the audio playback equipment is an external connected loudspeaker, it could be any other equipment having a loudspeaker, e.g. a sound bar. Nevertheless, the audio equipment should never be incorporated in the decoder equipment.

The numbers of video playback elements and/or of audio playback elements and/or of decoder elements could be greater than in the description above.

Although above the audio/video stream and the metadata are contained in the same incoming multimedia stream, the audio/video stream and the metadata could be contained in two different incoming streams sent in parallel to the decoder equipment. Thus, in a nonlimiting option, if the broadcast network is an Internet source supplying an audio/video stream using a DASH protocol (e.g. as described in the standard ISO/IEC23009-1, "Dynamic adaptive streaming over HTTP (DASH)), the metadata could be included in a corresponding MPD manifest (e.g. an MPD manifest as described in section 5.7 of said standard ISO/IEC23009-1).

The audio profile could be defined by some number of parameters different from those described above and/or by different parameters.

In the absence of metadata, or if the metadata does not include information about the program being viewed, the installation could be configured to apply a default audio profile that is predefined in the audio playback equipment.

The invention claimed is:

1. An installation comprising at least one decoder equipment and an audio playback equipment, the decoder equipment comprising:
    a first output connecting to the audio playback equipment;
    a second output suitable for connecting to video playback equipment;
    a communication interface arranged in service to receive both an incoming audio/video stream and also incoming metadata;
    first processor means arranged:
        to process the incoming audio/video stream in order to supply an audio signal at least to the audio playback equipment and a video signal to the video playback equipment;
        to extract from the incoming metadata information about the incoming audio/video stream and consequently to generate an order for the audio playback equipment, the order specifying an audio profile that is to be applied as a function of said information;
    the audio playback equipment including a communication interface arranged in service to receive from decoder equipment both the audio signal and also the order for an audio profile that is to be applied, the audio playback equipment including second processor means for adapting the audio signal as a function of said order,
    the decoder equipment being configured to supply the audio playback equipment both with the raw audio signal and also with an order to adapt said raw signal, with the adaptation then taking place within the audio playback equipment,
    wherein the information comprises a time,
    wherein the decoder equipment is configured to determinate a time scheduled for a change of audio profile that is to be applied,
    wherein the decoder combines the time scheduled for a change of audio profile at least with an end time of the program being viewed to as to
        always make coincide the change of audio profile with a change of program or
        make coincide the change of audio profile with a change of program if the time scheduled for a change of audio profile that is to be applied is closed to a change of program.

2. Installation according to claim 1, wherein the first processor means also extract, from the incoming metadata, additional information comprising an end time of a program that is contained in the incoming audio/video stream and that is going to be played back in service by the audio playback equipment and by the video playback equipment after the program currently being played back by the audio playback equipment and by the video playback equipment.

3. Installation according to claim 1, wherein the first processor means also extract from the incoming metadata other additional information comprising a content type descriptor of the incoming audio/video stream.

4. Installation according to claim 1, wherein the first processor means include at least one table associating each descriptor with parameters defining an audio profile, at least in part.

5. Installation according to claim 1, wherein the first processor means include at least one table associating each descriptor with an audio profile identifier.

6. Installation according to claim 1, wherein the audio profile is defined at least by a parameter for equalizing the audio signal.

7. Installation according to claim 1, wherein the audio profile is defined at least by a compressor or limiter effect.

8. Installation according to claim 1, wherein the audio profile is also a function of the time at which the audio/video stream is played back.

9. Installation according to claim 1, configured to calculate a transition period between two audio profiles.

10. Installation according to claim 1, configured to order the audio playback equipment to calculate a transition period between two audio profiles.

11. Installation according to claim 10, wherein the transition between two profiles is caused by a change of time at which the audio/video stream is to be played back and/or a change of program contained in the incoming audio/video stream that is played back in service by the audio playback equipment and by the video playback equipment.

12. Installation according to claim 1, configured to combine two audio profiles.

13. Installation according to claim 1, configured to order the audio playback equipment to combine two audio profiles.

14. Installation according to claim 1, wherein the second processor means include at least one table associating audio profile identifiers with parameters defining an audio profile, at least in part.

15. Installation according to claim 1, configured to change audio profile at a given time specified by the decoder equipment.

16. Installation according to claim 15, wherein for at least one audio parameter, the audio playback equipment duplicates the audio signal it receives in service from the decoder equipment, applies respective audio parameters to each copy, and combines the two copies in order to obtain a combined audio signal.

17. Installation according to claim 1, wherein for at least one audio parameter, in service, the audio playback equipment applies a combined audio parameter directly to the audio signal received from the decoder equipment.

18. A method of generating an order for an audio profile that is to be applied by audio playback equipment, the method being performed by the decoder equipment according to claim 1.

19. A method of applying an audio profile, which method is performed by the audio playback equipment according to claim 1.

20. A non-transitory computer readable storage medium storing a computer program including instructions for causing the audio playback equipment according to claim 1, to execute steps of a method of generating an order for an audio profile that is to be applied by audio playback equipment,
   wherein the information comprises an end time of a first program contained in the incoming audio/video stream and played back in service by the audio playback equipment and by the video playback equipment.

* * * * *